US008546473B2

(12) United States Patent  
Tanji et al.

(10) Patent No.: US 8,546,473 B2  
(45) Date of Patent: Oct. 1, 2013

(54) POLYOLEFIN RESIN COMPOSITION

(75) Inventors: Naoko Tanji, Saitama (JP); Takahiro Horikoshi, Saitama (JP); Atsushi Sakai, Saitama (JP); Hiroshi Yamanoi, Saitama (JP); Naoshi Kawamoto, Saitama (JP)

(73) Assignee: Adeka Corporation, Tokyo (JP)

( * ) Notice: Subject to any disclaimer, the term of this patent is extended or adjusted under 35 U.S.C. 154(b) by 165 days.

(21) Appl. No.: 12/992,805

(22) PCT Filed: May 11, 2009

(86) PCT No.: PCT/JP2009/058767
§ 371 (c)(1),
(2), (4) Date: Dec. 13, 2010

(87) PCT Pub. No.: WO2009/139350
PCT Pub. Date: Nov. 19, 2009

(65) Prior Publication Data
US 2011/0105657 A1 May 5, 2011

(30) Foreign Application Priority Data

May 16, 2008 (JP) ................................. 2008-130100
Oct. 2, 2008 (JP) ................................. 2008-257505

(51) Int. Cl.
C08K 5/15 (2006.01)
(52) U.S. Cl.
USPC ........................................ 524/107; 524/108
(58) Field of Classification Search
USPC ........................................................ 524/107
See application file for complete search history.

(56) References Cited

U.S. PATENT DOCUMENTS

| 5,122,752 A | 6/1992 | Koga et al. |
| 5,342,868 A | 8/1994 | Kimura et al. |
| 2007/0054996 A1* | 3/2007 | Tobita et al. .................. 524/107 |

FOREIGN PATENT DOCUMENTS

| JP | 50-139150 A | 11/1975 |
| JP | 51-22740 A | 2/1976 |
| JP | 53-117044 A | 10/1978 |
| JP | 58-1736 A | 1/1983 |
| JP | 58-17135 A | 2/1983 |
| JP | 59-184252 A | 10/1984 |
| JP | 62-209151 A | 9/1987 |
| JP | 2-102242 A | 4/1990 |
| JP | 3-102242 A | 4/1991 |
| JP | 4-153240 A | 5/1992 |
| JP | 5-140466 A | 6/1993 |
| JP | 5-156078 A | 6/1993 |
| JP | 8-3364 A | 1/1996 |
| JP | 8-27323 A | 1/1996 |
| JP | 08027323 A * | 1/1996 |
| JP | 9-296085 A | 11/1997 |
| JP | 2002-97322 A | 4/2002 |
| JP | 2002-275332 A | 9/2002 |
| JP | 2002275332 A * | 9/2002 |
| JP | 2005-75847 A | 3/2005 |
| JP | 2007-534827 A | 11/2007 |
| WO | WO 2005/111134 A2 | 11/2005 |

OTHER PUBLICATIONS

Translation of JP2002-275332, Jul. 2005.*
Translation of JP 08-027323, Jan. 1996.*
International Search Report dated Aug. 11, 2009 for PCT/JP2009/058767.

* cited by examiner

Primary Examiner — Hui Chin
(74) Attorney, Agent, or Firm — Birch, Stewart, Kolasch & Birch, LLP

(57) ABSTRACT

A polyolefin resin composition having excellent transparency which comprises a polyolefin resin having a melt flow rate (MFR) at 230° C. of 20 dg/min or more, (A) a dibenzylidene sorbitol compound represented by the following general formula (1),

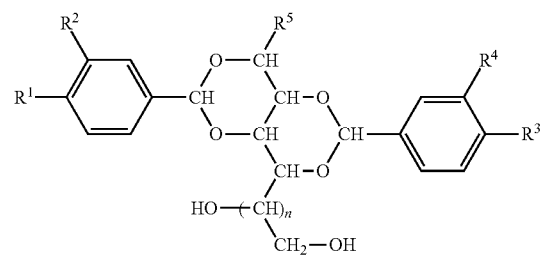

(wherein n represents an integer of 0 to 2; and $R^1$, $R^2$, $R^3$, $R^4$, and $R^5$ each independently represent a hydrogen atom or the like) and (B) an alkali metal salt compound of organic phosphoric acid ester represented by the following general formula (2),

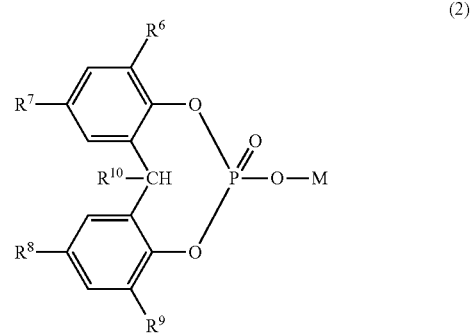

(wherein $R^6$ to $R^9$ each independently represent a hydrogen atom or the like), and wherein the sum of the amount of the component (A) and the component (B) is 0.01 to 1.0 part by mass per 100 parts by mass of the polyolefin resin, and (A)/(B), the ratio (mass ratio) between the component (A) and the component (B), is within a range from 99/1 to 80/20.

5 Claims, No Drawings

POLYOLEFIN RESIN COMPOSITION

TECHNICAL FIELD

The present invention relates to a polyolefin resin composition, in particular, relates to a polyolefin resin composition improved in transparency by adding specific compounds.

Also, the present invention relates to a crystalline nucleating agent composition for polyolefin resin and a polyolefin resin composition containing the crystalline nucleating agent composition, in particular, relates to a crystalline nucleating agent composition for polyolefin resin providing a polyolefin resin composition superior in transparency and having an excellent fluidity as powder, and a polyolefin resin composition containing the crystalline nucleating agent composition.

BACKGROUND ART

Polyolefin resins have advantages in their excellent moldability, heat resistance, mechanical properties, low specific gravities and the like, and have been widely used for films, sheets and various molded articles (e.g., structural parts). However, since polyolefin resins are slow in crystallization rate after molding, they are poor in the molding cycle performance, and have drawbacks of insufficient transparency and strength because of the generation of large crystals depending on crystallization progress after heat molding.

It has been known that all of these drawbacks are due to crystallinity of polyolefin resins and are resolved by rising crystallization temperature and rapidly generating fine crystals.

It is common knowledge that a crystalline nucleating agent or a crystallization accelerator is added in order to achieve this purpose. As the crystalline nucleating agent or the crystallization accelerator, compounds such as carboxylic acid metal salts such as sodium benzoate, aluminum 4-tert-butylbenzoate, sodium adipate and disodium bicyclo[2.2.1]heptane-2,3-dicarboxylate; phosphoric acid ester metal salts such as sodium bis(4-tert-butylphenyl)phosphate, sodium 2,2'-methylenebis(4,6-di-tert-butylphenyl)phosphate and lithium 2,2'-methylenebis(4,6-di-tert-butylphenyl)phosphate; and derivatives of polyols such as dibenzylidene sorbitol, bis(methylbenzylidene)sorbitol and bis(dimethylbenzylidene) sorbitol have been used conventionally.

Among these compounds, as a compound having especially great improving effect on transparency of polyolefin resin, for example, compounds of dibenzylidene sorbitol are proposed in Patent Documents 1 and 2 and the like, and dibenzylidene sorbitol compounds of which the benzene ring has substitution group are proposed in Patent Documents 3 to 5 and the like. Also, acetal compounds having substituted aryl group are proposed in Patent Document 6.

In addition, a cyclic phosphoric acid ester metal salt of alkylidene bisphenols is proposed in Patent Documents 7 to 10 and the like.

Furthermore, several approaches have been attempted to improve the effect by combining these compounds. For example, a combination use of a phosphate compound and a dibenzylidene sorbitol compound to crystalline propylene polymer is proposed in Patent Documents 11 and 12, and a combination use of a dibenzylidene sorbitol derivative and an aromatic organic phosphate ester metal salt to crystalline synthetic resin is proposed in Patent Document 13.

Benzylidene sorbitol compounds have been used as a crystalline nucleating agent capable of greatly improving optical properties, in particular, transparency of molded article produced by processing a polyolefin resin, while in the field that needs higher transparency, they cannot sufficiently satisfy the requirement.

As a method to overcome such problems, for example, a combination use of a cyclic phosphoric acid ester metal salt and bis(4-alkylbenzylidene)sorbitol to crystalline propylene polymer is proposed in Patent Document 11, a combination use of an aromatic phosphoric acid ester metal salt and a dibenzylidene sorbitol compound to crystalline propylene polymer is proposed in Patent Document 12, and a combination use of a dibenzylidene sorbitol derivative and an aromatic organic phosphoric acid ester metal salt to crystalline synthetic resin is proposed in Patent Document 13.

RELATED ART REFERENCE

Patent Documents

Patent Document 1: Japanese Unexamined Patent Application Publication No. 50-139150
Patent Document 2: Japanese Unexamined Patent Application Publication No. 51-22740
Patent Document 3: Japanese Unexamined Patent Application Publication No. 53-117044
Patent Document 4: Japanese Unexamined Patent Application Publication No. 58-17135
Patent Document 5: Japanese Unexamined Patent Application Publication No. 3-102242
Patent Document 6: Japanese Unexamined Patent Application Publication (translation of PCT Application) No. 2007-534827
Patent Document 7: Japanese Unexamined Patent Application Publication No. 58-1736
Patent Document 8: Japanese Unexamined Patent Application Publication No. 59-184252
Patent Document 9: Japanese Unexamined Patent Application Publication No. 5-140466
Patent Document 10: Japanese Unexamined Patent Application Publication No. 5-156078
Patent Document 11: Japanese Unexamined Patent Application Publication No. 62-209151
Patent Document 12: Japanese Unexamined Patent Application Publication No. 2-102242
Patent Document 13: Japanese Unexamined Patent Application Publication No. 8-3364

DISCLOSURE OF THE INVENTION

Problems to be Solved by the Invention

However, the improving effects of these combination uses described in Patent Documents 1 to 10 are not still satisfactory for practical use. In particular, they are inadequate to improve transparency of polyolefin resin having a high melt flow rate (MFR), and therefore, further improvement has been requested.

The improving effects described in Patent Documents 11 to 13 above are also not satisfactory for practical use, and therefore, further improvement has been requested. Additionally, these nucleating agent compositions are poor in fluidity as powder and improvement of the fluidity has been requested in view of transportability, workability, and ease of measuring amount.

Accordingly, an object of the present invention is to solve the above-described problems of conventional technologies, and to provide a polyolefin resin composition superior in transparency, even when the polyolefin resin has a high melt flow rate (MFR).

Also, another object of the present invention is to solve the above-described problems of conventional technologies, and to provide a crystalline nucleating agent composition for polyolefin resin that provides a polyolefin resin composition superior in transparency and has an excellent fluidity as powder and a polyolefin resin composition containing the crystalline nucleating agent composition.

Means for Solving the Problems

In the view of the above circumstances, the present inventors intensively studied for solving the above-described problems to discover that the purposes can be attained by adding a dibenzylidene sorbitol compound and an alkali metal salt compound of aromatic organic phosphoric acid ester to a polyolefin resin at a specific ratio, thereby completing the present invention.

Additionally, the present inventors intensively studied for solving the above-described problems to discover that the purposes can be attained by blending a specific benzylidene sorbitol compound, a specific phosphoric acid ester metal salt compound, and a specific fatty acid metal salt at a specific ratio, thereby completing the present invention.

That is, the polyolefin resin composition of the present invention comprises a polyolefin resin having a melt flow rate (MFR) at 230° C. of 20 dg/min or more, (A) a dibenzylidene sorbitol compound represented by the following general formula (1),

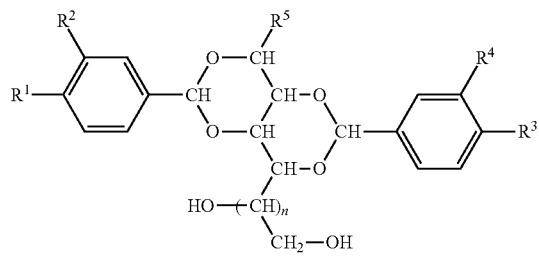

(wherein n represents an integer of 0 to 2; and $R^1$, $R^2$, $R^3$, $R^4$ and $R^5$ are each independently selected from the group consisting of a hydrogen atom, a halogen atom, an alkyl group having 1 to 4 carbon atoms, an alkoxy group having 1 to 4 carbon atoms, an alkenyl group having 2 to 4 carbon atoms, a hydroxyalkyl group having 1 to 4 carbon atoms, a halogenated alkyl group having 1 to 4 carbon atoms, and a hydroxyhalogenated alkyl group having 1 to 4 carbon atoms), and (B) an alkali metal salt compound of organic phosphoric acid ester represented by the following general formula (2),

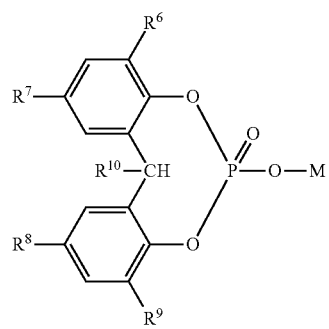

(wherein $R^6$ to $R^9$ each independently represents a hydrogen atom or an alkyl group having 1 to 9 carbon atoms; $R^{10}$ represents a hydrogen atom or a methyl group; and M represents an alkali metal), and wherein the sum of the amount of the component (A) and the component (B) is 0.01 to 1.0 part by mass per 100 parts by mass of the polyolefin resin, and (A)/(B), the ratio (mass ratio) between the component (A) and the component (B), is within a range from 99/1 to 80/20.

In the polyolefin resin composition of the present invention, it is preferable that the polyolefin resin is a polypropylene resin having a melt flow rate (MFR) at 230° C. of 20 to 100 dg/min. It is also preferable that in the general formula (1), $R^1$ to $R^4$ are each independently selected from the group consisting of a hydrogen atom and an alkyl group having 1 to 4 carbon atoms, and $R^5$ is a hydrogen atom. Furthermore, the composition wherein, in the general formula (2), M is lithium and $R^6$ to $R^9$ are tert-butyl groups is preferably used.

Also, the crystalline nucleating agent composition for polyolefin resin of the present invention comprises, per 100 parts by mass of (C) 1,3:2,4-bis(3',4'-dimethylbenzylidene) sorbitol, 3 to 20 parts by mass of (D) a phosphoric acid ester metal salt compound represented by the following general formula (3)

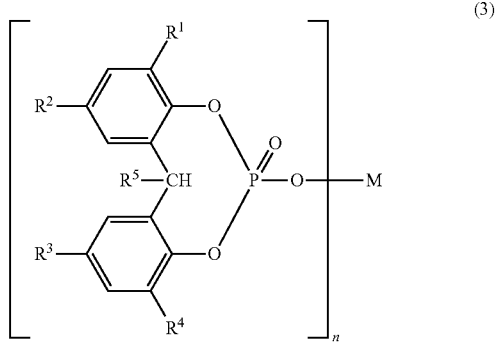

(wherein $R^1$ to $R^4$ each independently represents a hydrogen atom or an alkyl group having 1 to 9 carbon atoms; $R^5$ represents a hydrogen atom or methyl group; n represents 1 or 2; when n is 1, M represents an alkali metal; and when n is 2, M represents Al(OH)), and 0.5 to 10 parts by mass of (E) a compound which is a monovalent metal salt of fatty acid having 12 to 22 carbon atoms, optionally substituted by hydroxy group, and wherein (D)/(E), the mass ratio between (D) the phosphoric acid ester metal salt compound and the compound (E), is within a range from 90/10 to 50/50.

In addition, the crystalline nucleating agent composition for polyolefin resin of the present invention, wherein (D+E)/(C), the mass ratio between the sum of the amount of (D) the phosphoric acid ester metal salt compound and the compound (E) and that of (C) the 1,3:2,4-bis(3',4'-dimethylbenzylidene) sorbitol, is within a range from 5/95 to 20/80, is preferably used.

Further, in the crystalline nucleating agent composition for polyolefin resin of the present invention, as (D) the phosphoric acid ester metal salt compound, a compound of which the metal salt is a lithium salt or an aluminium salt is preferably used.

Furthermore, in the crystalline nucleating agent composition for polyolefin resin of the present invention, as the compound (E), a compound of which the metal salt is a lithium salt is preferably used.

Also, the polyolefin resin composition of the present invention comprises, per 100 parts by mass of polyolefin resin, 0.01 to 10 parts by mass of the crystalline nucleating agent composition for polyolefin resin.

Effects of the Invention

According to the present invention, a polyolefin resin composition which has an excellent transparency can be provided by blending a formulation of a dibenzylidene sorbitol compound and an alkali metal salt compound of aromatic organic phosphoric acid ester with a specific ratio into a polyolefin resin, even when the polyolefin resin has a high melt flow rate (MFR).

According to the present invention, a crystalline nucleating agent composition for polyolefin resin which exhibits a good fluidity can be obtained by blending (C) the specific benzylidene sorbitol compound, (D) the specific phosphoric acid ester metal salt, and the specific monovalent metal salt of fatty acid at a specific ratio. Further, the molded article obtained by processing the polyolefin resin composition containing the crystalline nucleating agent composition for polyolefin resin has an excellent transparency.

BEST MODE FOR CARRYING OUT THE INVENTION

The polyolefin resin composition of the present invention will be described more concretely.

Examples of the polyolefin resin used for the polyolefin resin composition of the present invention include α-olefin polymers such as low-density polyethylenes, linear low-density polyethylenes, high-density polyethylenes, isotactic polypropylenes, syndiotactic polypropylenes, hemi-isotactic polypropylenes, cycloolefin polymers, stereoblock polypropylenes, poly-3-methyl-1-butene, poly-3-methyl-1-pentene, poly-4-methyl-1-pentene; and α-olefin copolymers such as ethylene/propylene block or random copolymers.

Among the above-described polyolefin resins, polypropylene resins are preferred since they allow exertion of a remarkable effect of usage of the crystalline nucleating agent according to the present invention, and polypropylene, ethylene/propylene block or random copolymers, α-olefin other than ethylene/propylene block or random copolymers, and mixtures of these propylene polymers and other α-olefin polymers are especially preferably used.

In the polyolefin resin, the resins having melt flow rate (MFR) at 230° C. of 20 dg/min or more are preferred since they remarkably benefit from the effect of the invention. In the view of real molding, the melt flow rate (MFR) is more preferably 20 to 100 dg/min. In cases where the rate is 20 dg/min or less, the effect of the present invention may not sometimes be obtained. Although it is difficult to extrusion mold for a polyolefin resin compositions having the melt flow rate (MFR) of 100 dg/min or more, the effect of the present invention, that is, the effect to improve the transparency of polyolefin resin composition is not denied.

In the polyolefin resin composition of the present invention, the dibenzylidene sorbitol compound represented by the above general formula (1) and the alkali metal salt of aromatic organic phosphoric acid ester represented by the above general formula (2) are blended as crystalline nucleating agents.

Examples of the alkyl group having 1 to 4 carbon atoms represented by $R^1$, $R^2$, $R^3$, $R^4$, and $R^5$ in the general formula (1) include methyl group, ethyl group, propyl group, isopropyl group, butyl group, sec-butyl group, tert-butyl group, and isobutyl group.

Examples of the alkoxy group having 1 to 4 carbon atoms represented by $R^1$, $R^2$, $R^3$, $R^4$, and $R^5$ in the general formula (1) include methoxy group, ethoxy group, propoxy group, and butoxy group.

Examples of the alkenyl group having 2 to 4 carbon atoms represented by $R^1$, $R^2$, $R^3$, $R^4$, and $R^5$ in the general formula (1) include allyl group and 3-methylallyl group.

Examples of the hydroxylalkyl group having 1 to 4 carbon atoms represented by $R^1$, $R^2$, $R^3$, $R^4$, and $R^5$ in the general formula (1) include 1-hydroxypropyl group and 1,2,3-trihydroxypropyl group.

Examples of the halogenated alkyl group having 1 to 4 carbon atoms represented by $R^1$, $R^2$, $R^3$, $R^4$, and $R^5$ in the general formula (1) include 1,2-dibromopropyl group.

Examples of the hydroxy-halogenated alkyl group having 1 to 4 carbon atoms represented by $R^1$, $R^2$, $R^3$, $R^4$, and $R^5$ in the general formula (1) include 1-hydroxy-2-bromopropyl group.

Examples of the dibenzylidene sorbitol compound used in the present invention include the following compounds. However, the present invention is not limited by the following compounds.

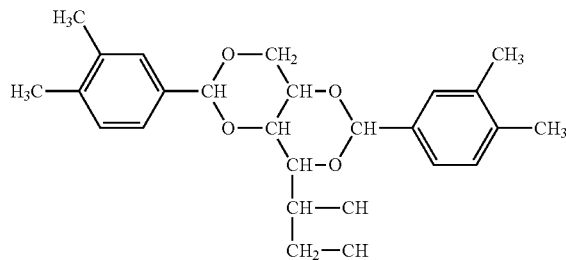

S-1

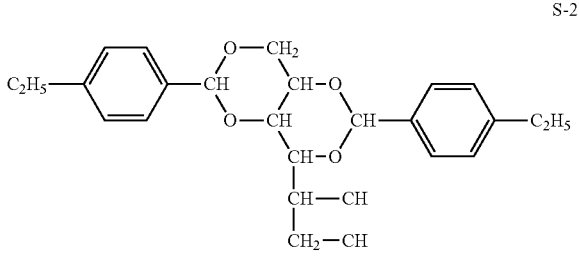

S-2

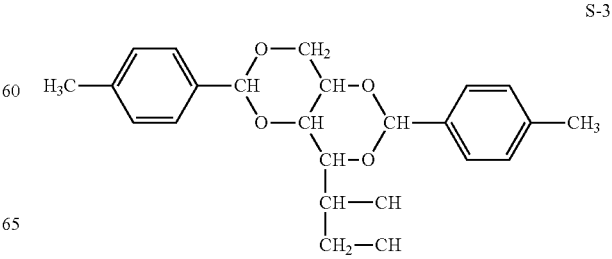

S-3

-continued

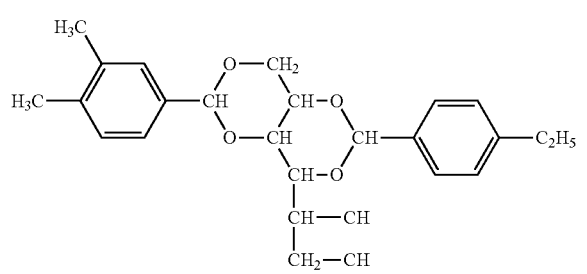
S-4

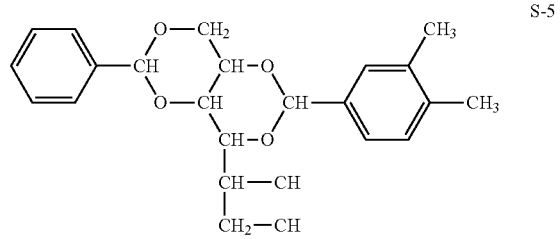
S-5

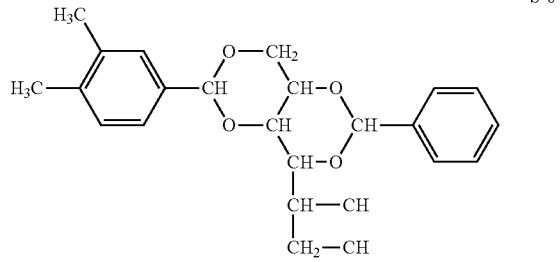
S-6

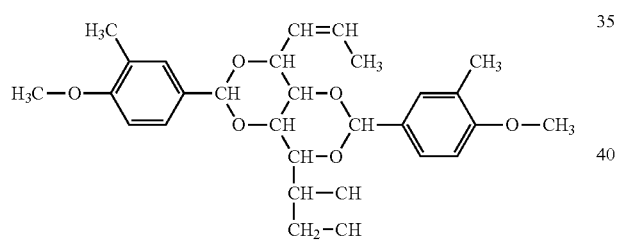
S-7

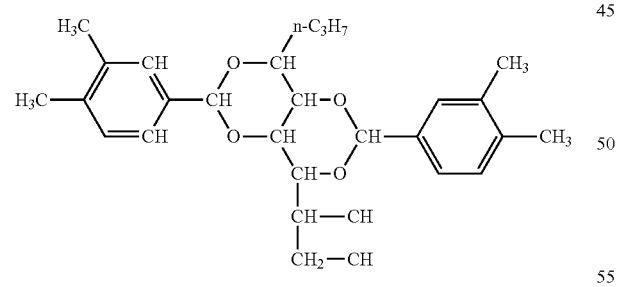
S-8

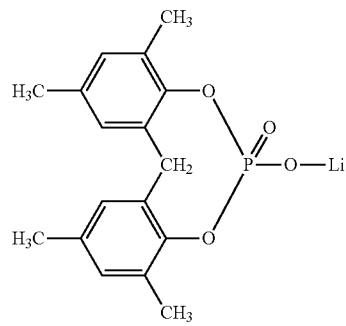
P-1

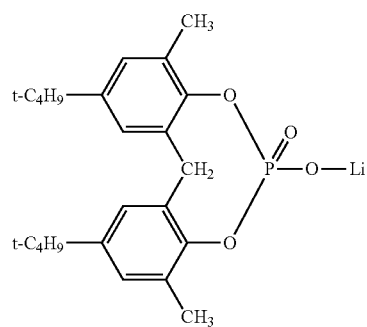
P-2

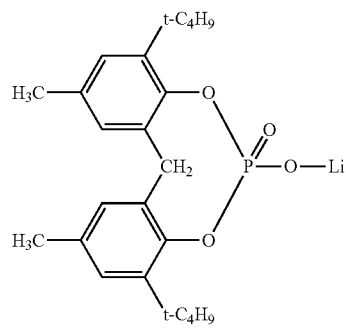
P-3

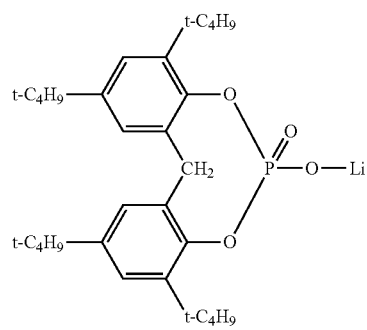
P-4

Examples of the alkyl group having 1 to 9 carbon atoms represented by $R^6$ to $R^9$ in the general formula (2) include, besides the alkyl group exemplified above, amyl, tert-amyl, hexyl, heptyl, octyl, isooctyl, tert-octyl, 2-ethylhexyl, nonyl, and isononyl. Among them, tert-butyl group is particularly preferred.

Examples of the alkali metal salt compound of aromatic organic phosphoric acid ester used in the present invention include the following compounds. However, the present invention is not limited by the following compounds.

-continued

P-5 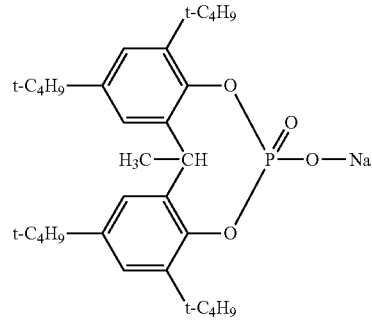

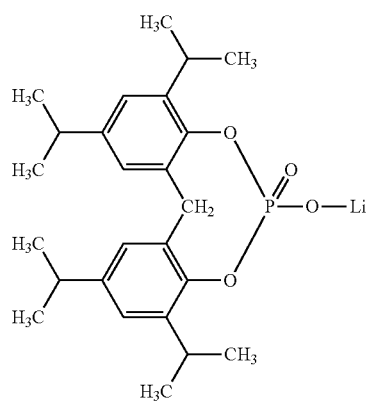

P-6 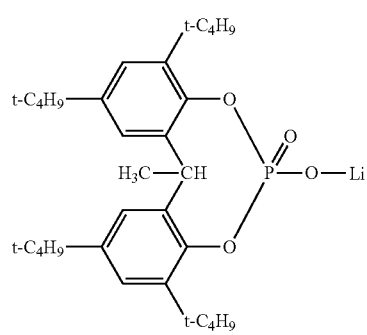

P-7 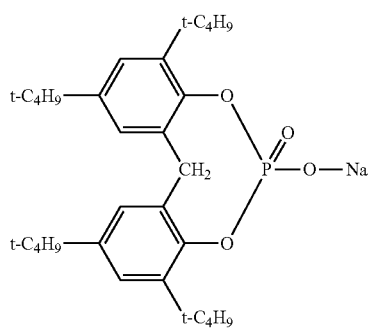

P-8 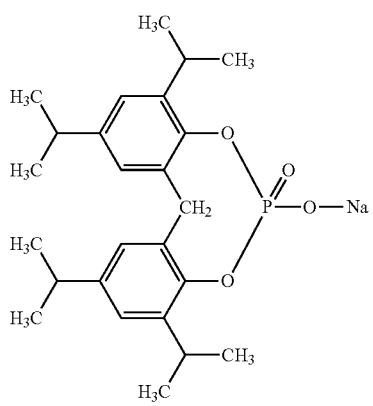

P-9

In the polyolefin resin composition of the present invention, the total amount of the dibenzylidene sorbitol compound and the alkali metal salt compound of organic phosphoric ester is 0.01 to 1.0 part by mass, preferably 0.03 to 0.7 part by mass, more preferably 0.03 to 0.6 part by mass per 100 parts by mass of the polyolefin resin. In cases where the total amount is less than 0.01 part by mass, the effect of its addition is insufficient, and in cases where the total amount is more than 1.0 part by mass, it may bleed to the surface of molded articles obtained by processing of the polyolefin resin composition.

In the polyolefin resin composition of the present invention, the effect of the present invention can be obtained from the composition of which the ratio between (A) the dibenzylidene sorbitol compound and (B) the alkali metal salt compound of organic phosphoric acid ester, namely (A)/(B), is within a range from 99/1 to 80/20. In case where the ratio is beyond the range, the transparency may be deteriorated. More preferably, the ratio (mass ratio) is within the range from 99/1 to 90/10. The effect of the present invention is remarkable for the composition of which the dibenzylidene sorbitol compound is within the range from 90/10 to 99/1 with respect to the alkali metal salt of organic phosphoric acid ester. In case where the ratio is beyond the range, the effect of improving transparency may be deteriorated.

The crystalline nucleating agent composition for polyolefin resin of the present invention will be described in more details below.

The crystalline nucleating agent composition for polyolefin resin of the present invention comprises, per 100 parts by mass of (C) 1,3:2,4-bis(3',4'-dimethylbenzylidene) sorbitol, 3 to 20 parts by mass of (D) a phosphoric acid ester metal salt compound represented by the following general formula (3),

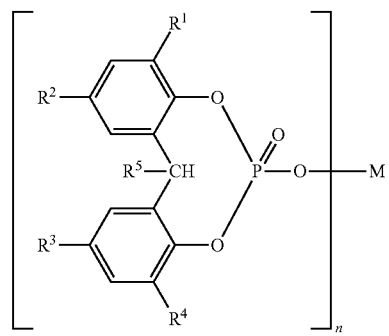

(3)

(wherein $R^1$ to $R^4$ each independently represents a hydrogen atom or an alkyl group having 1 to 9 carbon atoms; $R^5$ represents a hydrogen atom or methyl group; n represents 1 or 2; when n is 1, M represents an alkali metal; and when n is 2, M represents Al(OH)), and 0.5 to 10 parts by mass of (E) a compound which is a monovalent metal salt of fatty acid having 12 to 22 carbon atoms, optionally substituted by hydroxy group.

Examples of the alkyl group having 1 to 9 carbon atoms represented by $R^1$, $R^2$, $R^3$, and $R^4$ in the general formula (3) include methyl group, ethyl group, propyl group, isopropyl group, butyl group, sec-butyl group, tert-butyl group, isobutyl group, amyl group, isoamyl group, tert-amyl group, hexyl group, cyclohexyl group, heptyl group, isoheptyl group, and tert-heptyl group. Among them, tert-butyl group is particularly preferred.

Examples of the alkali metal represented by M in the general formula (3) include lithium, sodium, and potassium. Particularly, a compound of which M is lithium is preferably used.

Examples of (D) the phosphoric acid ester metal salt compound used in the present invention include the following compounds. However, the present invention is not limited by the following compounds.

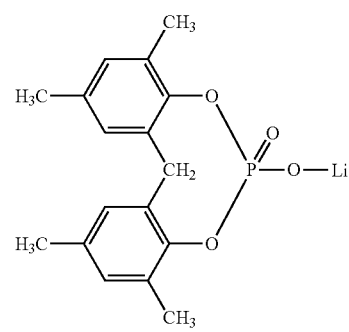

P-10

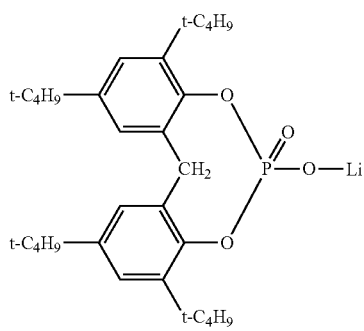

P-11

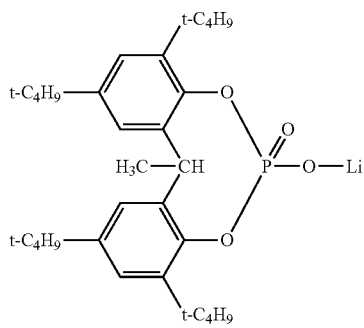

P-12

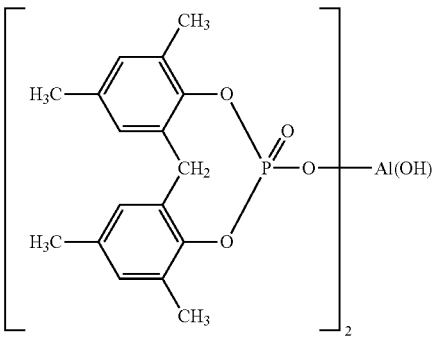

P-13

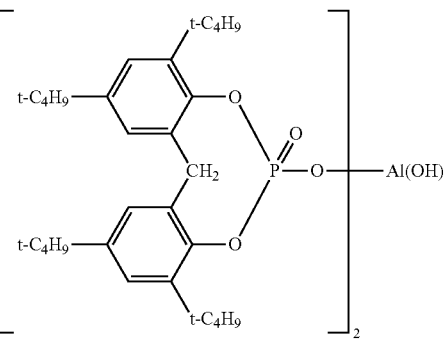

P-14

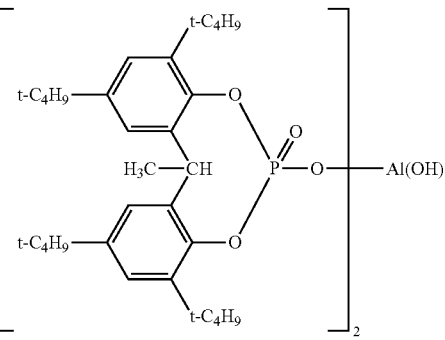

P-15

In (E) the compound which is a monovalent metal salt of fatty acid having 12 to 22 carbon atoms, optionally substituted by hydroxy group, the fatty acid having 12 to 22 carbon atoms, optionally substituted by hydroxy group, may be used without distinguishing between saturated or unsaturated fatty acid, and may have branched chain, cyclic structure, and hydroxy group. Examples of the fatty acid include dodecanoic acid (lauric acid), tetradecanoic acid (myristic acid), pentadecanoic acid, hexadecanoic acid (palmitic acid), 9-hexadecenoic acid (palmitoleic acid), heptadecanoic acid (margaric acid), octadecanoic acid (stearic acid), 12-hydroxystearic acid, cis-9-octadecenoic acid (oleic acid), 11-octadecenoic acid (vaccenic acid), cis,cis-9,12-octadecadienoic acid (linoleic acid), 9,11,13-octadecatrienoic acid (eleostearic acid), nonadecanoic acid (tuberculostearic acid), icosanoic acid (arachidic acid), docosanoic acid (behenic acid), and the like.

Examples of the monovalent metal salt of the compound (E) include lithium, sodium, and potassium. Particularly, lithium is preferably used.

In the present invention, use may be made of (C) the 1,3: 2,4-bis(3',4'-dimethylbenzylidene)sorbitol which is commercially available or is synthesized according to a common procedure. It is not particularly limited.

In the crystalline nucleating agent composition for polyolefin resin of the present invention, it is critically important that the mass ratio between (D) the phosphoric acid ester metal salt compound and the compound (E), namely (D)/(E), is within a range from 90/10 to 50/50. Due to the mass ratio within the range, the effect of the present invention can be obtained. In case where the ratio is beyond the range, the transparency is deteriorated.

Additionally, in the crystalline nucleating agent composition for polyolefin resin of the present invention, it is preferable that the mass ratio between the sum of the amount of (D) the phosphoric acid ester metal salt compound and the component (E) and that of (C) the 1,3:2,4-bis(3',4'-dimethylbenzylidene)sorbitol, namely (D+E)/(C), is within a range from 5/95 to 20/80. Due to the mass ratio within the range, more excellent transparency is achieved.

The production method of the crystalline nucleating agent composition for polyolefin resin of the present invention is not limited, as long as it comprises, per 100 parts by mass of (C) the 1,3:2,4-bis(3',4'-dimethylbenzylidene) sorbitol, 3 to 20 parts by mass of (D) the phosphoric acid ester metal salt compound, and 0.5 to 10 parts by mass of the compound (E). The composition can be produced by generally known methods described in JP 2005-120237, JP 2005-162867, or the like. For example, (C) the 1,3:2,4-bis(3',4'-dimethylbenzylidene) sorbitol, (D) the phosphoric acid ester metal salt compound, and the compound (E) may be blended and then mixed by dry-blending. Some of the components (C) to (E) may be pre-blended, and then dry-blended with remaining components. After dry-blending, the resultant blend may be mixed using a mill roll, a Banbury mixer, a super mixer, or the like and kneaded using a single- or twin-screw extruder or the like. Further, the polyolefin resin composition can be directly produced by blending the components (C) to (E) and other components.

The other polyolefin resin composition of the present invention will then be described more concretely.

Examples of the polyolefin resin used for the polyolefin resin composition of the present invention include α-olefin polymers such as low-density polyethylenes, linear low-density polyethylenes, high-density polyethylenes, isotactic polypropylenes, syndiotactic polypropylenes, hemi-isotactic polypropylenes, cycloolefin polymers, stereoblock polypropylenes, poly-3-methyl-1-butene, poly-3-methyl-1-pentene, poly-4-methyl-1-pentene; and α-olefin copolymers such as ethylene/propylene block or random copolymers.

As the polyolefin resin, propylene polymers such as polypropylene, ethylene/propylene block or random copolymers, and α-olefin other than ethylene/propylene block or random copolymers, or the mixtures of these propylene polymers and other α-olefin polymers can be also used.

The polyolefin resin composition of the present invention comprises the crystalline nucleating agent composition for polyolefin resin of the present invention in the amount of 0.01 to 10 parts by mass, preferably 0.03 to 0.7 part by mass, more preferably 0.03 to 0.4 part by mass, per 100 parts by mass of the polyolefin resin. In cases where the amount of the crystalline nucleating agent composition for polyolefin resin of the present invention is less than 0.01 part by mass, the effect of its addition is insufficient, and in cases where the amount of the crystalline nucleating agent composition for polyolefin resin of the present invention is more than 10 parts by mass, it may bleed to the surface of molded articles obtained by processing of the polyolefin resin composition.

In the polyolefin resin composition of the present invention, if necessary, other conventionally known additives that are commonly used may be added to the polyester resin composition in the ranges that do not impair the effect of the present invention.

Examples of the other additives include plasticizers such as neopentyl glycol derivatives, polyalkylene glycols and derivatives thereof, and epoxy compounds of polyols and derivatives thereof; phenolic, phosphoric, and sulfuric antioxidants and the like; light stabilizers such as hindered amine light stabilizers, ultraviolet absorbers, and the like; lubricants such as hydrocarbon compounds, fatty acid compounds, aliphatic alcohol compounds, aliphatic ester compounds, aliphatic amide compounds, aliphatic carboxylic acid metal salt compounds, other metallic soaps, and the like; heavy metal deactivators; antistatic agents such as cationic surfactants, anionic surfactants, nonionic surfactants, amphoteric surfactants, and the like; halogen compounds; phosphoric acid ester compounds; phosphoric acid amide compounds; melamine compounds; fluorocarbon resins or metal oxides; flame retardants such as (poly)phosphoric acid melamine, (poly)phosphoric acid piperazine, and the like; fillers such as glass fibers, calcium carbonate, and the like; inorganic silicate additives such as hydrotalcite, fumed silica, fine particle silica, silica rock, diatomites, clay, kaolin, diatomaceous earth, silica gel, calcium silicate, sericite, kaolinite, flint, feldspar powder, vermiculite, attapulgite, talc, mica, minesotite, pyrophyllite, silica, and the like; nucleating agents such as benzoic acid sodium salt, disodium bicyclo[2.2.1]heptane-2,3-dicarboxylate, and the like; coloring agents; pigments; anti-fogging agents; various fillers; release agents; fragrances; foaming agents; antibacterial agents; antifungal agents, and the like. In particular, phenolic and phosphoric antioxidants are preferably used because of the effect of preventing coloring of the polyolefin resin composition.

Examples of the other additives include plasticizers such as neopentyl glycol derivatives, polyalkylene glycols and derivatives thereof, and epoxy compounds of polyols and derivatives thereof; antioxidants such as phenolic antioxidants, phosphoric antioxidants, sulfuric antioxidants, and the like; light stabilizers such as hindered amine light stabilizers, ultraviolet absorbers, and the like; lubricants such as hydrocarbon compounds, fatty acid compounds, aliphatic alcohol compounds, aliphatic ester compounds, aliphatic amide compounds, aliphatic carboxylic acid metal salt compounds, other metallic soaps, and the like; heavy metal deactivators; antistatic agents such as cationic surfactants, anionic surfactants, nonionic surfactants, amphoteric surfactants, and the like; halogen compounds; phosphoric acid ester compounds; phosphoric acid amide compounds; melamine compounds; fluorocarbon resins or metal oxides; flame retardants such as (poly)phosphoric acid melamine, (poly)phosphoric acid piperazine, and the like; fillers such as glass fibers, calcium carbonate, and the like; inorganic silicate additives such as hydrotalcite, fumed silica, fine particle silica, silica rock, diatomites, clay, kaolin, diatomaceous earth, silica gel, calcium silicate, sericite, kaolinite, flint, feldspar powder, vermiculite, attapulgite, talc, mica, minesotite, pyrophyllite, silica, and the like; other crystalline nucleating agents not used in the crystalline nucleating agent compositions for polyolefin resin of the present invention; coloring agents; pigments; anti-fogging agents; various fillers; release agents; fragrances; foaming agents; antibacterial agents; antifungal agents, and the like. In particular, phenolic and phosphoric antioxidants are preferably used because of the effect of preventing coloring of the polyolefin resin composition.

Examples of the phenolic antioxidants include 2,6-di-tert-butyl-p-cresol, 2,6-diphenyl-4-octadecyloxyphenol, stearyl (3,5-di-tert-butyl-4-hydroxyphenyl)propionate, distearyl(3, 5-di-tert-butyl-4-hydroxybenzyl)phosphonate, tridecyl-3,5-di-tert-butyl-4-hydroxybenzyl thioacetate, thiodiethylenebis[(3,5-di-tert-butyl-4-hydroxyphenyl) propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methyl benzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl)propionate]methane, 2-tert-butyl-4-methyl-6-(2-acroyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, triethyleneglycolbis[β-(3-tert-butyl-4-hydroxy-5-methylphenyl)propionate], and the like.

The amount of the phenolic antioxidant is 0.001 to 10 parts by mass, preferably, 0.01 to 5 parts by mass, per 100 parts by mass of the polyolefin resin.

Examples of the phosphoric antioxidants include triphenyl phosphite, tris(2,4-di-tert-butylphenyl)phosphite, tris(2,5-di-tert-butylphenyl)phosphite, tris(nonylphenyl)phosphite, tris(dinonylphenyl)phosphite, tris(mono/di-mixed nonylphenyl) phosphite, diphenyl acid phosphite, 2,2'-methylenebis(4,6-di-tert-butylphenyl)octyl phosphite, diphenyldecyl phosphite, diphenyloctyl phosphite, di(nonylphenyl)pentaerythritol diphosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentylglycol)-1,4-cyclohexane dimethyl diphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearyl pentaerythritol diphosphite, tetra(C12-15 mixed alkyl)-4,4'-isopropylidenediphenyl phosphite, bis[2,2'-methylenebis(4,6-diamylphenyl)]-isopropylidenediphenyl phosphite, tetratridecyl-4,4'-butylidenebis(2-tert-butyl-5-methylphenol) diphosphite, hexa(tridecyl)-1,1,3-tris(2-methyl-5-tert-butyl-4-hydroxyphenyl)butane triphosphite, tetrakis(2,4-di-tert-butylphenyl)biphenylene diphosphonite, tris(2-[(2,4,7,9-tetrakis-tert-butyldibenzo[d,f][1,3,2]dioxa phosphepin-6-yl) oxy]ethyl)amine, 9,10-dihydro-9-oxa-10-phosphaphenanthrene-10-oxide, 2-butyl-2-ethylpropanediol-2,4,6-tri-tert-butylphenol monophosphite, and the like.

The amount of the phosphoric antioxidant is 0.001 to 10 parts by mass, preferably, 0.01 to 5 parts by mass, per 100 parts by mass of the polyolefin resin.

Examples of the sulfuric antioxidants include dialkyl thiodipropionates such as dilauryl, dimyristyl, myristylstearyl, and distearyl esters of thiodipropionic acid, and the like; and polyol β-alkylmercaptopropionates such as pentaerythritol tetra(β-dodecylmercaptopropionate) and the like.

The amount of the sulfuric antioxidant is 0.001 to 10 parts by mass, preferably, 0.01 to 5 parts by mass, per 100 parts by mass of the polyolefin resin.

Examples of the hindered amine light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, 1,2,2,6,6-pentamethyl-4-piperidyl methacrylate, 2,2,6,6-tetramethyl-piperidyl methacrylate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-bis(tridecyl)-1,2,3,4-butanetetracarboxylate, bis(1,2,2,6,6-pentamethyl-4-piperidyl)-bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 3,9-bis[1,1-dimethyl-2-{tris(2,2,6,6-tetramethyl-4-piperidyloxycarbonyloxy) butylcarbonyloxy}ethyl]-2,4,8,10-tetraoxaspiro[5.5] undecane, 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5.5] undecane, 1,6-bis(2,2,6,6-tetramethyl-4-piperidylamino) hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-ylamino] undecane, 1,6,11-tris[2,4-bis(N-butyl-N-(1,2,2,6,6-pentamethyl-4-piperidyl)amino)-s-triazin-6-ylamino] undecane, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, and the like.

The amount of the hindered amine compound is 0.001 to 10 parts by mass, preferably, 0.01 to 5 parts by mass, per 100 parts by mass of the polyolefin resin.

Examples of the ultraviolet absorbers include 2-hydroxybenzophenones such as 2,4-dihydroxybenzophenone, 2-hydroxy-4-methoxybenzophenone, 2-hydroxy-4-octoxybenzophenone, 5,5'-methylene bis(2-hydroxy-4-methoxybenzophenone), and the like; 2-(2-hydroxyphenyl) benzotriazoles, such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene bis(4-tert-octyl-6-benzotriazolylphenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole, 2-[2-hydroxy-4-(3-methacryloyloxypropyl) phenyl]benzotriazole, and the like; 2-(2-hydroxyphenyl)-4,6-diaryl-1,3,5-triazines such as 2-(2-hydroxy-4- methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12-C13 mixed alkoxy-2-hydroxypropoxy)phenyl]-4,6-bis(2,4-dimethylphenyl)-1,3, 5-triazine, 2-[2-hydroxy-4-(2-acryloyloxyethoxy)phenyl]-4, 6-bis(4-methylphenyl)-1,3,5-triazine, 2-(2,4-dihydroxy-3-allylphenyl)-4,6-bis(2,4-dimethylphenyl)-1,3,5-triazine, 2,4, 6-tris(2-hydroxy-3-methyl-4-hexyloxyphenyl)-1,3,5-triazine, and the like; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl (3,5-di-tert-butyl-4-hydroxy)benzoate, behenyl(3,5-di-tert-butyl-4-hydroxy)benzoate, and the like; substituted oxanilides, such as 2-ethyl-2'-ethoxyoxanilide, 2-ethoxy-4'-dodecyloxanilide, and the like; cyanoacrylates such as ethyl α-cyano-β, β-diphenylacrylate, methyl-2-cyano-3-methyl-3-(p-methoxyphenyl)acrylate, and the like; and various metal salts or metal chelates, particularly salts or chelates of nickel or chromium.

The amount of the ultraviolet absorber is 0.001 to 10 parts by mass, preferably, 0.01 to 5 parts by mass, per 100 parts by mass of the polyolefin resin.

Examples of the aliphatic amide compounds used as the lubricant include mono-fatty acid amides, such as lauric acid amide, stearic acid amide, oleic acid amide, erucic acid amide, ricinoleic acid amide, 12-hydroxystearic acid amide, and the like; N,N'-bis-fatty acid amides, such as N,N'-ethylene-bis-lauric acid amide, N,N'-methylene-bis-stearic acid amide, N,N'-ethylene-bis-stearic acid amide, N,N'-ethylene-bis-oleic acid amide, N,N'-ethylene-bis-behenic acid amide, N,N'-ethylene-bis-12-hydroxystearic acid amide, N,N'-butylene-bis-stearic acid amide, N,N'-hexamethylene-bis-stearic acid amide, N,N'-hexamethylene-bis-oleic acid amide, N,N'-xylylene-bis-stearic acid amide, and the like; alkylol amides, such as stearic acid monomethylol amide, palm oil fatty acid monoethanol amide, stearic acid diethanol amide, and the like; N-substituted fatty acid amides, such as N-oleylstearic acid amide, N-oleyloleic acid amide, N-stearylstearic acid amide, N-stearyloleic acid amide, N-oleylpalmitic acid amide, N-stearylerucic acid amide, and the like; and N,N'-substituted dicarboxylic acid amides, such as N,N'-dioleyla-dipic acid amide, N,N'-distearyladipic acid amide, N,N'-dioleylsebacic acid amide, N,N'-distearylsebacic acid amide, N,N'-distearylterephthalic acid amide, N,N'-distearylisophthalic acid amide, and the like. These compounds may be used alone or as a mixture of two or more.

The amount of the lubricant is 0.01 to 30 parts by mass, preferably, 0.1 to 20 parts by mass, per 100 parts by mass of the polyolefin resin.

In the polyolefin resin composition of the present invention, the method of blending the dibenzylidene sorbitol compound represented by the general formula (1) and the alkali metal salt compound of organic phosphoric acid ester represented by the general formula (2) into the polyolefin resin is not particularly limited, and a generally known method can be used. For example, a powder or pellets of the polyolefin resin and additives may be mixed by dry blending, or parts of additives may be pre-blended and then dry-blended with the remaining components. After dry blending, for example, the resultant blend may be mixed using a mill roll, a Banbury mixer, a super mixer, or the like and kneaded using a single- or twin-screw extruder or the like. The mixing and kneading is generally performed at a temperature of about 120 to 220° C. Methods wherein additives are added during a polymerization step of a synthetic resin; methods wherein additives are mixed in advance at desired ratios with, for example, a granulation aid such as a binder, wax, solvent, silica or the like, followed by granulation to produce a one-pack type composite additive, which one-pack type composite additive is then added to the polyolefin resin; and methods wherein a master batch containing additives at high concentrations is prepared, which master batch is then added to the polyolefin resin; can be used.

In the polyolefin resin composition of the present invention, the method of blending the crystalline nucleating agent composition for polyolefin resin of the present invention into the polyolefin resin is not particularly limited, and a generally known method can be used. For example, a powder or pellets of the polyolefin resin and additives may be mixed by dry blending, or parts of additives may be pre-blended and then dry-blended with the remaining components. After dry blending, for example, the resultant blend may be mixed using a mill roll, a Banbury mixer, a super mixer, or the like and kneaded using a single- or twin-screw extruder or the like. The mixing and kneading is generally performed at a temperature of about 120 to 220° C. Methods wherein additives are added during a polymerization step of a synthetic resin; methods wherein additives are mixed in advance at desired ratios with, for example, a granulation aid such as a binder, wax, solvent, silica or the like, followed by granulation to produce a one-pack type composite additive, which one-pack type composite additive is then added to the polyolefin resin; and methods wherein a master batch containing additives at high concentrations is prepared, which master batch is then added to a polyolefin resin; can be used.

In molding the polyolefin resin composition of the present invention, molding such as extrusion molding, injection molding, blow molding, vacuum molding, compression molding, or the like can be performed in the same manner as general plastics, and various molded products such as sheets, rods, bottles, vessels, and the like can be easily formed. In addition, the polyolefin resin composition of the present invention may be mixed with glass fibers, carbon fibers, or the like to prepare fiber-reinforced plastics.

EXAMPLES

The present invention will be described more concretely by way of Examples, but the present invention is not limited by the Examples and the like below.

To 100 parts by mass of a polyolefin resin shown in Tables 1 to 3 below: ethylene/propylene random copolymer, 0.1 part by mass of a phenol antioxidant: tetrakis[methylene-3-(3',5'-di-tert-butyl-4'-hydroxyphenyl) propionate]methane, 0.1 part by mass of a phosphorus antioxidant: tris(2,4-di-tert-butylphenyl)phosphite, 0.05 part by mass of calcium stearate and 0.2 part by mass of a mixture of the crystalline nucleating agents shown in Tables 1 to 3 below (but Comparative Example 4 contains no crystalline nucleating agent) were mixed by Henschel mixer (FM200; manufactured by Mitsui Mining Co., Ltd.) at 1000 rpm for 1 minute, and the resulting mixture was extruded using a single-screw extruder (OEX3024; manufactured by DDM Co., Ltd.) under processing conditions of a temperature of 240° C. and a screw speed of 30 rpm to produce pellets. For the obtained pellets, the following evaluations were carried out.

(Haze)

Using an injection molding apparatus (EC100-2A; manufactured by TOSHIBA MACHINE CO., LTD.), the above-obtained pellets were filled into a die at an injection temperature of 200° C. and an injection pressure of 70 to 80 MPa for 40 seconds, and cooled in the die at 40° C. for 20 seconds, followed by injection molding under conditions for removal of a sheet from the die, to obtain a sheet having a square shape sizing 60 mm×60 mm with a thickness of 1 mm. Immediately after the injection molding, the sheet was left to stand in an incubator whose inner temperature was 23° C. for not less than 48 hours, and haze of the test piece was calculated by Haze Guard II (manufactured by Toyo Seiki Seisaku-sho, Ltd.).

The lower value indicates the better transparency of test piece. These results are shown in Tables 1 to 3 below.

TABLE 1

| | Melt flow rate of polyolefin resin | Ratio of crystalline nucleating agent [%] | | | Evaluation |
|---|---|---|---|---|---|
| | (230° C.) [dg/min] | S-1 | P-4 | P-7 | Haze [%] |
| Example 1 | 28 | 90 | 10 | | 11.5 |
| Example 2 | | 90 | | 10 | 11.6 |
| Comparative Example 1 | | 100 | | | 11.9 |

TABLE 2

| | Melt flow rate of polyolefin resin | Ratio of crystalline nucleating agent [%] | | | Evaluation |
|---|---|---|---|---|---|
| | (230° C.) [dg/min] | S-1 | P-4 | P-7 | Haze [%] |
| Example 3 | 40 | 97 | 3 | | 9.0 |
| Example 4 | | 90 | 10 | | 8.8 |
| Example 5 | | 80 | 20 | | 8.8 |
| Example 6 | | 90 | | 10 | 9.5 |
| Comparative Example 2 | | 70 | 30 | | 10.9 |
| Comparative Example 3 | | 100 | | | 9.8 |
| Comparative Example 4[1] | | | | | 67 |

[1]Polyolefin resin composition in Comparative Example 4 contains no crystalline nucleating agent

TABLE 3

| | Melt flow rate of polyolefin resin | Ratio of crystalline nucleating agent [%] | | Evaluation |
|---|---|---|---|---|
| | (230° C.) [dg/min] | S-1 | P-4 | Haze [%] |
| Example 7 | 60 | 90 | 10 | 24.1 |
| Comparative Example 5 | | 100 | | 24.4 |

In addition, as Reference Examples, the evaluation results of a polyolefin resin having a melt flow rate (MFR) at 230° C. of 8 dg/min are shown in Table 4 below.

TABLE 4

| | Melt flow rate of polyolefin resin | Ratio of crystalline nucleating agent [%] | | | Evaluation |
|---|---|---|---|---|---|
| | (230° C.) [dg/min] | S-1 | P-4 | P-7 | Haze [%] |
| Reference Example 1 | 8 | 100 | | | 8.8 |
| Reference Example 2 | | 90 | 10 | | 9.3 |
| Reference Example 3 | | 90 | | 10 | 9.7 |

It was revealed, according to Comparative Examples 2 and 3 in Table 2, that polyolefin resin compositions of which the ratio between the dibenzylidene sorbitol compound and the alkali metal salt compound of organic phosphoric acid ester was out of the range from 99/1 to 80/20 failed to achieve satisfactory transparency. On the other hand, it was revealed, according to Examples 3 to 5 in Table 2, that the polyolefin resin compositions of the present invention of which the ratio between the dibenzylidene sorbitol compound and the alkali metal salt compound of organic phosphoric acid ester was within the range from 99/1 to 80/20 are excellent in transparency.

In addition, it was revealed, according to Reference Examples 2 and 3 in Table 4, that in case where the melt flow rate (MFR) at 230° C. of polyolefin resin was less than 20 dg/min, the effect of the present invention was not obtained, even when the ratio between the dibenzylidene sorbitol compound and the alkali metal salt compound of aromatic organic phosphoric acid ester was within the range from 99/1 to 80/20.

Therefore, it was confirmed that the polyolefin resin composition of the present invention, which meets the requirements of the present invention that a polyolefin resin has a melt flow rate (MFR) at 230° C. of 20 dg/min or more and the ratio between a dibenzylidene sorbitol compound and an alkali metal salt compound of aromatic organic phosphate ester is within the range from 99/1 to 80/20, attains an excellent improving effect on transparency.

Next, to 100 parts by mass of a polyolefin resin (ethylene/propylene random copolymer) having a melt flow rate (MFR) shown in Tables 5 to 8 below, 0.1 part by mass of a phenol antioxidant: tetrakis[methylene-3-(3',5'-di-tert-butyl-4'-hydroxyphenyl)propionate]methane, 0.1 part by mass of a phosphorus antioxidant: tris(2,4-di-tert-butylphenyl)phosphite, 0.05 part by mass of calcium stearate and 0.2 part by mass of a crystalline nucleating agent composition for polyolefin resin (hereinafter called "crystalline nucleating agent composition") shown in Tables 5 to 8 below were mixed by Henschel mixer (FM200; manufactured by Mitsui Mining Co., Ltd.) at 1000 rpm for 1 minute, and the resulting mixture was extruded using a twin-screw extruder (PCM-30; manufactured by Ikegai Corp.) under processing conditions of a temperature of 240° C. and a screw speed of 160 rpm to produce pellets. However, as polyolefin resins having MFR of 28 dg/min, 40 dg/min, and 60 dg/min, the resins of which the MFR was regulated by adding peroxide to a resin having MFR of 8 dg/min were used. For the obtained pellets, the following evaluations were carried out.

In Tables 5 to 8, P-11, P-13, and P-14 represent (D) the phosphoric acid ester metal salt compound described above.

(Haze)

Using an injection molding apparatus (EC100-2A; manufactured by TOSHIBA MACHINE CO., LTD.), the above-obtained pellets were filled into a die at an injection temperature of 200° C. and an injection pressure of 70 to 80 MPa for 40 seconds, and cooled in the die at 40° C. for 20 seconds, followed by injection molding under conditions for removal of a sheet from the die, to obtain a sheet having a square shape sizing 60 mm×60 mm with a thickness of 1 mm. Immediately after the injection molding, the sheet was left to stand in an incubator whose inner temperature was 23° C. for not less than 48 hours, and haze of the test piece was calculated by Haze Guard II (manufactured by Toyo Seiki Seisaku-sho, Ltd.). The lower value indicates the better transparency of test piece. The results are each shown in Tables 5 to 8 below.

(Angle of Repose)

Each of the crystalline nucleating agent compositions shown in Tables 5 to 8 was poured and accumulated on disk through funnel, and an angle at which the accumulation kept stable without voluntary collapse was measured as angle of repose. The lower value indicates the better fluidity of the crystalline nucleating agent composition. The results are each shown in Tables 5 to 8 below.

TABLE 5

| | MFR[1] [dg/min] | Composition ratio of crystalline nucleating agent composition [mass %] | | | Evaluation | |
| | | (A) S-1[2] | (B) P-14 | (C) LIM[3] | Haze [%] | Angle of repose |
|---|---|---|---|---|---|---|
| Example 8 | 8 | 95 | 3 | 2 | 8.0 | 50.0 |
| Example 9 | 8 | 90 | 6 | 4 | 8.7 | 45.9 |
| Example 10 | 8 | 80 | 12 | 8 | 8.7 | 42.5 |

TABLE 5-continued

| | MFR[1] [dg/min] | Composition ratio of crystalline nucleating agent composition [mass %] | | | Evaluation | |
| | | (A) S-1[2] | (B) P-14 | (C) LIM[3] | Haze [%] | Angle of repose |
|---|---|---|---|---|---|---|
| Comparative Example 6 | 8 | 100 | — | — | 8.8 | 55.1 |
| Comparative Example 7 | 8 | 97 | 1.8 | 1.2 | 9.1 | 54.3 |
| Comparative Example 8 | 8 | 95 | 5 | — | 9.5 | 54.8 |

[1] MFR: the values were evaluated at 230° C. by the measurement complying with ISO1133
[2] S-1: 1,3:2,4-bis(3',4'-dimethylbenzylidene)sorbitol
[3] LIM: Stearic acid lithium

TABLE 6

| | MFR[1] [dg/min] | Composition ratio of crystalline nucleating agent composition [mass %] | | | | | Evaluation | |
| | | (A) S-1[2] | (B) | | (C) | | Haze [%] | Angle of repose |
| | | | P-11 | P-13 | LIM[3] | 12OHLI[4] | | |
|---|---|---|---|---|---|---|---|---|
| Example 11 | 28 | 92 | — | 4.8 | 3.2 | — | 11.3 | 48.7 |
| Example 12 | 28 | 90 | — | 6 | 4 | — | 9.7 | 45.9 |
| Example 13 | 28 | 90 | 8 | — | — | 2 | 11.6 | 50.3 |
| Comparative Example 9 | 28 | 100 | — | — | — | — | 11.9 | 55.1 |
| Comparative Example 10 | 28 | 90 | — | 10 | — | — | 13.0 | 53.5 |
| Comparative Example 11 | 28 | — | — | 60 | 40 | — | 13.2 | 40.0 |

[4] 12OHLI: 12-hydroxystearic acid lithium

TABLE 7

| | MFR[1] [dg/min] | Composition ratio of crystalline nucleating agent composition [mass %] | | | | | | Evaluation | |
| | | (A) | | (B) | | (C) | | Haze [%] | Angle of repose |
| | | S-1[2] | S-2[6] | P-11 | P-13 | LIM[3] | 12OHLI[4] | | |
|---|---|---|---|---|---|---|---|---|---|
| Example 14 | 40 | 95 | — | 4 | — | — | 1 | 7.2 | 52.2 |
| Example 15 | 40 | 90 | — | 8 | — | — | 2 | 7.7 | 50.3 |
| Example 16 | 40 | 80 | — | 16 | — | — | 4 | 8.1 | 48.7 |
| Example 17 | 40 | 95 | — | — | 3 | 2 | — | 7.7 | 50.0 |
| Example 18 | 40 | 90 | — | — | 6 | 4 | — | 7.5 | 45.9 |
| Example 19 | 40 | 90 | — | — | 5 | 5 | — | 7.5 | 47.0 |
| Example 20 | 40 | 80 | — | — | 12 | 8 | — | 8.3 | 42.5 |
| Comparative Example 12[5] | 40 | — | — | — | — | — | — | 67 | — |
| Comparative Example 13 | 40 | 100 | — | — | — | — | — | 9.8 | 55.1 |
| Comparative Example 14 | 40 | 90 | — | — | 9.5 | 0.5 | — | 11.8 | 53.5 |
| Comparative Example 15 | 40 | 90 | — | — | 4 | 6 | — | 10.0 | 46.8 |
| Comparative Example 16 | 40 | 70 | — | — | 18 | 12 | — | 10.0 | 41.4 |
| Comparative Example 17 | 40 | — | — | — | 60 | 40 | — | 12.3 | 40.0 |
| Comparative Example 18 | 40 | — | 100 | — | — | — | — | 9.9 | —[7] |

TABLE 7-continued

| | MFR[1] | Composition ratio of crystalline nucleating agent composition [mass %] | | | | | Evaluation | |
|---|---|---|---|---|---|---|---|---|
| | | (A) | | (B) | | (C) | Haze | Angle of |
| | [dg/min] | S-1[2] | S-2[6] | P-11 | P-13 | LIM[3] | 12OHLI[4] | [%] | repose |
| Comparative Example 19 | 40 | — | 90 | — | 6 | 4 | — | 10.9 | —[7] |
| Comparative Example 20 | 40 | — | — | 80 | — | — | 20 | 11.4 | 56.0 |

[5]Polyolefin resin composition of Comparative Example 12 contains no crystalline nucleating agent composition.
[6]S-2: bis(p-methylbenzylidene)sorbitol
[7]no data

TABLE 8

| | MFR[1] | Composition ratio of crystalline nucleating agent composition [mass %] | | | | Evaluation | |
|---|---|---|---|---|---|---|---|
| | | (A) | (B) | | (C) | | Haze | Angle of |
| | [dg/min] | S-1[2] | P-11 | P-13 | LIM[3] | 12OHLI[4] | [%] | repose |
| Example 21 | 60 | 90 | 8 | — | — | 2 | 23.5 | 50.3 |
| Example 22 | 60 | 90 | — | 6 | 4 | — | 23.8 | 45.9 |
| Comparative Example 21 | 60 | 100 | — | — | — | — | 24.4 | 55.1 |
| Comparative Example 22 | 60 | 90 | — | 10 | — | — | 26.7 | 53.5 |

It was revealed, according to Comparative Examples 6 to 8 in Table 5 and Comparative Examples 9 to 11 in Table 6, that polyolefin resin compositions which didn't meet the requirements that the composition comprises, per 100 parts by mass of (C) the sorbitol compound, 3 to 20 parts by mass of (D) the phosphoric acid ester metal salt compound, and 0.5 to 10 parts by mass of (E) the compound which is a monovalent metal salt of fatty acid having 12 to 22 carbon atoms, optionally substituted by hydroxy group, failed achieve satisfactory transparency.

Additionally, it was revealed, according to Comparative Examples 14 and 15 in Table 7, that polyolefin resin compositions of which the mass ratio between (D) the phosphoric acid ester metal salt compound and (E) the compound which is a monovalent metal salt of fatty acid having 12 to 22 carbon atoms, optionally substituted by hydroxy group, namely (D)/(E), is out of the range from 90/10 to 50/50 failed to achieve satisfactory transparency.

Further, it was revealed, according to Comparative Example 16 in Table 7, that polyolefin resin composition of which the mass ratio between the sum of the amount of (D) the phosphoric acid ester metal salt compound and (E) the compound which is a monovalent metal salt of fatty acid having 12 to 22 carbon atoms, optionally substituted by hydroxy group, and the amount of (C) the 1,3:2,4-bis(3',4'-dimethylbenzylidene) sorbitol, namely (D+E)/(C), is out of the range from 5/95 to 20/80 failed to achieve satisfactory transparency.

Furthermore, it was revealed, according to Comparative Example 19 in Table 7, that even when the composition ratio of (C) the sorbitol compound, (D) the phosphoric acid ester metal salt compound, and (E) the compound which is a monovalent metal salt of fatty acid having 12 to 22 carbon atoms, optionally substituted by hydroxy group, was within the same range as that of the polyolefin resin composition of the present invention, the polyolefin resin composition of which (C) the sorbitol compound is not 1,3:2,4-bis(3',4'-dimethylbenzylidene) sorbitol failed to achieve satisfactory transparency.

Therefore, no satisfactory transparency was achieved from the polyolefin resin compositions containing a crystalline nucleating agent composition for polyolefin resin which didn't meet the requirements of the present invention. On the other hand, it was confirmed, according to Examples 8 to 22 in Tables to 8, that the polyolefin resin composition of the present invention attained a superior transparency to that of the polyolefin resin composition containing sorbitol compound alone as the crystalline nucleating agent composition.

In addition, according to Comparative Example 13 in Table 7, the crystalline nucleating agent composition consisting of a sorbitol compound alone had the angle of repose of 55.1, which means a poor fluidity. Also, according to Comparative Example 20 in Table 7, the crystalline nucleating agent composition consisting of (D) the phosphoric acid ester metal salt compound and (E) the compound which is a monovalent metal salt of fatty acid having 12 to 22 carbon atoms, optionally substituted by hydroxy group, alone, had the angle of repose of 56.0, which means a poor fluidity. However, according to Examples 12 to 14, the crystalline nucleating agent compositions for polyolefin resin of the present invention have the angles of repose of 48.7 to 52.2, and therefore an unexpected result, that is, a significant improvement of fluidity, was confirmed.

Therefore, the present invention can provide a polyolefin resin composition superior in transparency, by the crystalline nucleating agent composition for polyolefin resin containing 1,3:2,4-bis(3',4'-dimethylbenzylidene) sorbitol as (C) the specific sorbitol compound, (D) the phosphoric acid ester metal salt compound represented by the general formula (3), and (E) the compound which is a monovalent metal salt of fatty acid having 12 to 22 carbon atoms, optionally substituted by hydroxy group, at the specific ratio.

The invention claimed is:

1. A crystalline nucleating agent composition for polyolefin resin comprising, per 100 parts by mass of (C) 1,3:2,4-bis(3',4'-dimethylbenzylidene)sorbitol, 3 to 20 parts by mass of (D) a phosphoric acid ester metal salt compound represented by the following general formula (3),

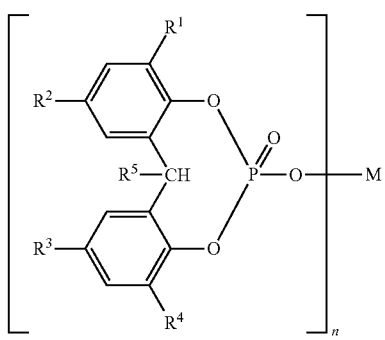

and 0.5 to 10 parts by mass of (E) a compound which is a monovalent metal salt of fatty acid having 12 to 22 carbon atoms, optionally substituted by hydroxy group, and wherein (D)/(E), the mass ratio between (D) the phosphoric acid ester metal salt compound and the compound (E), is within a range from 90/10 to 50/50, wherein compound (D) is selected from the group consisting of
i) a compound wherein $R^1$ to $R^4$ each independently represents a t-butyl group, $R^5$ is a hydrogen atom, n is 1, M is Li;
ii) a compound wherein $R^1$ to $R^4$ each independently represents a methyl group, $R^5$ is a hydrogen atom, n is 2, M is Al(OH); and
iii) a compound wherein $R^1$ to $R^4$ each independently represents a t-butyl group, $R^5$ is a hydrogen atom, n is 2, M is Al(OH).

2. The crystalline nucleating agent composition for polyolefin resin according to claim 1, wherein (D+E)/(C), the mass ratio between the sum of the amount of (D) the phosphoric acid ester metal salt compound and the compound (E) and that of (C) the 1,3:2,4-bis(3',4'-dimethylbenzylidene)sorbitol, is within a range from 5/95 to 20/80.

3. The crystalline nucleating agent composition for polyolefin resin according to claim 1, wherein the metal salt of the compound (E) is a lithium salt.

4. The crystalline nucleating agent composition for polyolefin resin according to claim 1, wherein the fatty acid is selected from the group consisting of dodecanoic acid, tetradecanoic acid, pentadecanoic acid, hexadecanoic acid, 9-hexadecenoic acid, heptadecanoic acid, octadecanoic acid, 12-hydroxystearic acid, cis-9-octadecenoic acid, 11-octadecenoic acid, cis,cis-9,12-octadecadienoic acid, 9,11,13-octadecatrienoic acid, nonadecanoic acid, icosanoic acid, and docosanoic acid.

5. The crystalline nucleating agent composition for polyolefin resin according to claim 1, wherein compound (E) is 12-hydroxystearic acid lithium or stearic acid lithium.

* * * * *